United States Patent
Park et al.

(10) Patent No.: US 10,020,923 B2
(45) Date of Patent: Jul. 10, 2018

(54) METHOD OF TRANSMITTING AND RECEIVING DOWNLINK SIGNAL IN UNLICENSED BAND IN WIRELESS COMMUNICATION SYSTEM AND APPARATUS THEREFOR

(71) Applicant: LG ELECTRONICS INC., Seoul (KR)

(72) Inventors: Hanjun Park, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 15/224,072

(22) Filed: Jul. 29, 2016

(65) Prior Publication Data
US 2017/0034817 A1    Feb. 2, 2017

Related U.S. Application Data

(60) Provisional application No. 62/199,215, filed on Jul. 30, 2015.

(51) Int. Cl.
*H04L 5/00* (2006.01)
*H04W 74/08* (2009.01)

(52) U.S. Cl.
CPC ............ *H04L 5/0053* (2013.01); *H04L 5/001* (2013.01); *H04L 5/0035* (2013.01); *H04W 74/0816* (2013.01)

(58) Field of Classification Search
CPC ..... H04L 5/001; H04L 5/0035; H04L 5/0053; H04L 5/0007; H04W 74/0816; H04W 74/0808; H04W 16/14; H04W 28/26
See application file for complete search history.

(56) References Cited

U.S. PATENT DOCUMENTS

| | | | |
|---|---|---|---|
| 2016/0127098 A1* | 5/2016 | Ng | H04L 5/0048 370/329 |
| 2016/0286579 A1* | 9/2016 | Park | H04L 5/0048 |
| 2016/0345326 A1* | 11/2016 | Yerramalli | H04W 72/0453 |

* cited by examiner

*Primary Examiner* — Mohamed Kamara
(74) *Attorney, Agent, or Firm* — Birch, Stewart, Kolasch & Birch, LLP

(57) ABSTRACT

Provided is a method of transmitting data by sensing a channel in an unlicensed band including sensing a channel on a secondary cell (S-cell) on which data is to be transmitted in the unlicensed band and if it is determined that the channel is in an unoccupied state, transmitting data to a reception node in one of a plurality of flexible TX time windows configured in advance or transmitting a reservation signal to the reception node in one of a plurality of data transmission prohibit windows configured in advance for the data transmission. The plurality of the flexible TX time windows and The plurality of the data transmission prohibit windows are configured to respectively have a boundary of a transmission unit shifted from a boundary of a transmission unit of a primary cell (P-cell) transmission structure by a specific time.

16 Claims, 15 Drawing Sheets

(a)

(b)

METHOD OF TRANSMITTING AND RECEIVING DOWNLINK SIGNAL IN UNLICENSED BAND IN WIRELESS COMMUNICATION SYSTEM AND APPARATUS THEREFOR

CROSS-REFERENCE TO RELATED APPLICATIONS

This application claims the benefit of the U.S. Provisional Application No. 62/199,215, filed on Jul. 30, 2015, which is hereby incorporated by reference as if fully set forth herein.

BACKGROUND OF THE INVENTION

Field of the Invention

The present invention relates to a wireless communication system, and more particularly, to a method of transmitting and receiving a downlink signal in an unlicensed band and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to an apparatus and method thereof that substantially obviate one or more problems due to limitations and disadvantages of the related art.

An object of the present invention is to provide a method of transmitting and receiving a downlink signal in an unlicensed band.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting data by sensing a channel in an unlicensed band, which is performed by a transmission node in a wireless communication system, according to one embodiment of the present invention is provided. The method includes the sensing a channel on a secondary cell (S-cell) on which data is to be transmitted in the unlicensed band and if it is determined that the channel on the S-cell is in an unoccupied state as a result of the channel sensing, transmitting data to a reception node in one of a plurality of flexible transmission (TX) time windows configured in advance or transmitting a reservation signal to the reception node in one of a plurality of data transmission prohibit windows configured in advance for the data transmission. In this case, the plurality of the flexible TX time windows and the plurality of the data transmission prohibit windows may be configured to respectively have a boundary of a transmission unit shifted from a boundary of a transmission unit of a primary cell (P-cell) transmission structure by a specific time and the data transmission may be performed according to a boundary of a transmission unit of a corresponding flexible TX time window or a boundary of a transmission unit of a corresponding data transmission prohibit window.

Additionally or alternatively, the specific time may has a duration corresponding to one slot.

Additionally or alternatively, the transmitting may further include generating a TB (transport block) corresponding to the data to be transmitted, generating candidate coded bits by applying rate-matching or bit-level puncturing, for each of data transmission start candidate timings in the plurality of the flexible TX time windows, to the TB, and transmitting the generated coded bits corresponding to a data transmission start timing determined according to the result of the channel sensing.

Additionally or alternatively, the data transmission start timing may be transmitted to the reception node in advance via control information or may be informed to the reception node by detecting the reservation signal.

Additionally or alternatively, candidate coded bits for data transmission start candidate timings corresponding to the plurality of the data transmission prohibit windows may not be generated among the plurality of the flexible TX time windows.

Additionally or alternatively, a length of the plurality of the flexible TX time windows may be configured to be minimized.

Additionally or alternatively, transmission power of the data transmission may be increased in proportion to a length of a duration in which is not used for transmitting data in the plurality of the flexible TX time windows.

Additionally or alternatively, the method may further include transmitting information on the transmission power of the data transmission to the reception node via specific signaling.

To further achieve these objects and other advantages and in accordance with the purpose of the invention, as embodied and broadly described herein, according to a different embodiment, a transmission node configured to perform channel sensing and data transmission according to the sensed channel in an unlicensed band in a wireless communication system can include a transmitter, a receiver, and a processor configured to control the transmitter and the receiver, the processor configured to sense a channel on a secondary cell (S-cell) on which data is to be transmitted in the unlicensed band, if it is determined that the channel on which the data is to be transmitted is in an unoccupied state as a result of the channel sensing, transmit data to a reception node in one of a plurality of flexible transmission (TX) time windows configured in advance or transmit a reservation signal to the reception node in one of a plurality of data transmission prohibit windows configured in advance for the data transmission. In this case, the plurality of the flexible TX time windows and the plurality of the data transmission prohibit windows may be configured to respectively have a boundary of a transmission unit shifted from a boundary of a transmission unit of a primary cell (P-cell) transmission structure by a specific time and the data transmission may be performed according to a boundary of a transmission unit of a corresponding flexible TX time window or a boundary of a transmission unit of a corresponding data transmission prohibit window.

Additionally or alternatively, the specific time may has a duration corresponding to one slot.

Additionally or alternatively, the processor can be configured to generate a TB (transport block) corresponding to the data to be transmitted, generate candidate coded bits by applying rate-matching or bit-level puncturing, which is performed for each of data transmission start candidate timings in the plurality of the flexible TX time windows, to the TB and transmit the generated coded bits corresponding to a data transmission start timing determined according to the result of the channel sensing.

Additionally or alternatively, the data transmission start timing can be transmitted to the reception node in advance via control information or can be informed to the reception node by detecting the reservation signal.

Additionally or alternatively, candidate coded bits for data transmission start candidate timings corresponding to the plurality of the data transmission prohibit windows may not be generated among the plurality of the flexible TX time windows.

Additionally or alternatively, a length of the plurality of the flexible TX time windows can be configured to be minimized.

Additionally or alternatively, transmission power of the data transmission can be increased in proportion to a length of a duration in which is not used for transmitting data in the plurality of the flexible TX time windows.

Additionally or alternatively, the processor can be configured to transmit information on the transmission power of the data transmission to the reception node via specific signaling.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
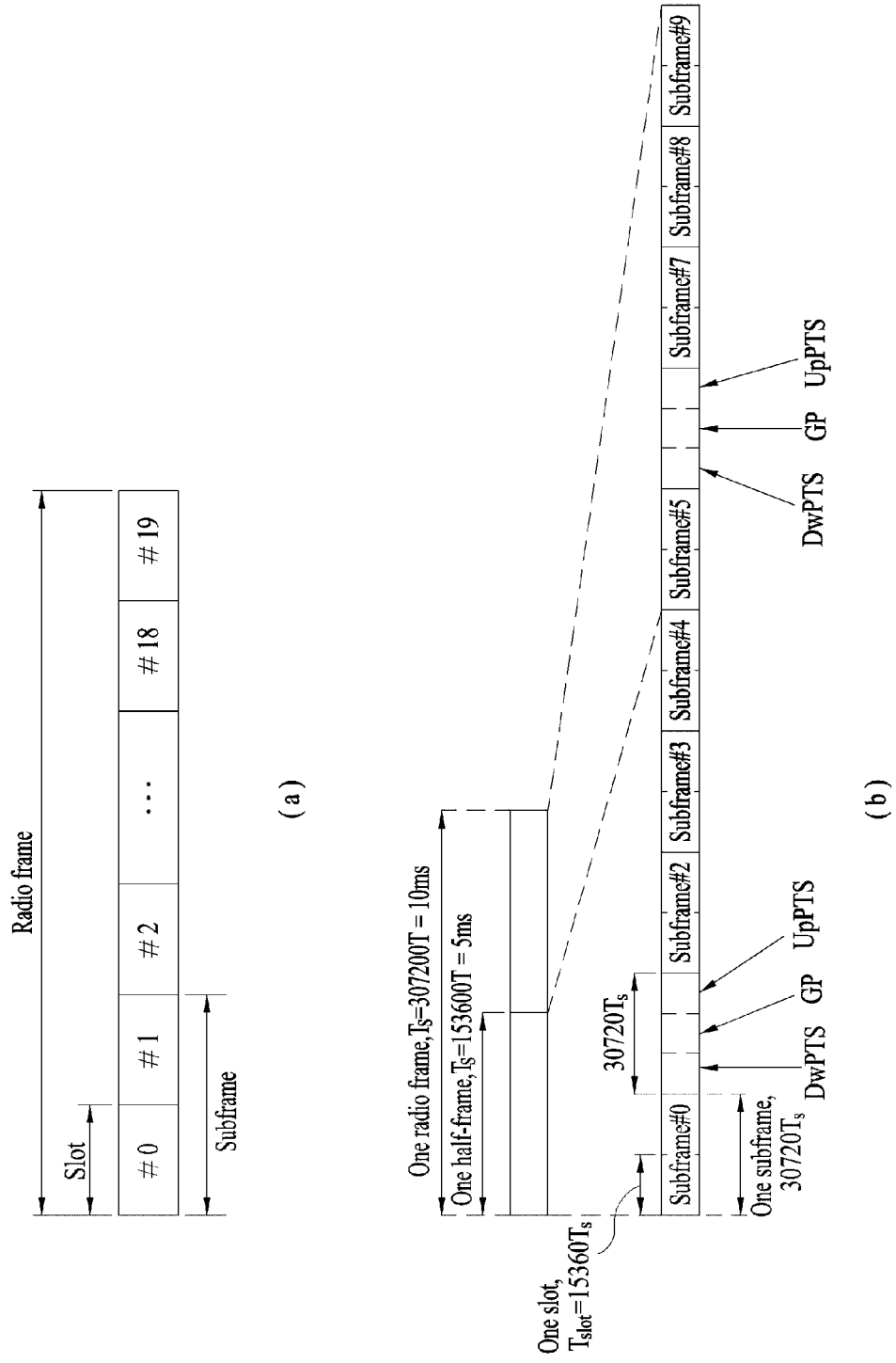
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(*a*) illustrates a frame structure for frequency division duplex (FDD) used in 3GPP LTE/LTE-A and FIG. 1(*b*) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
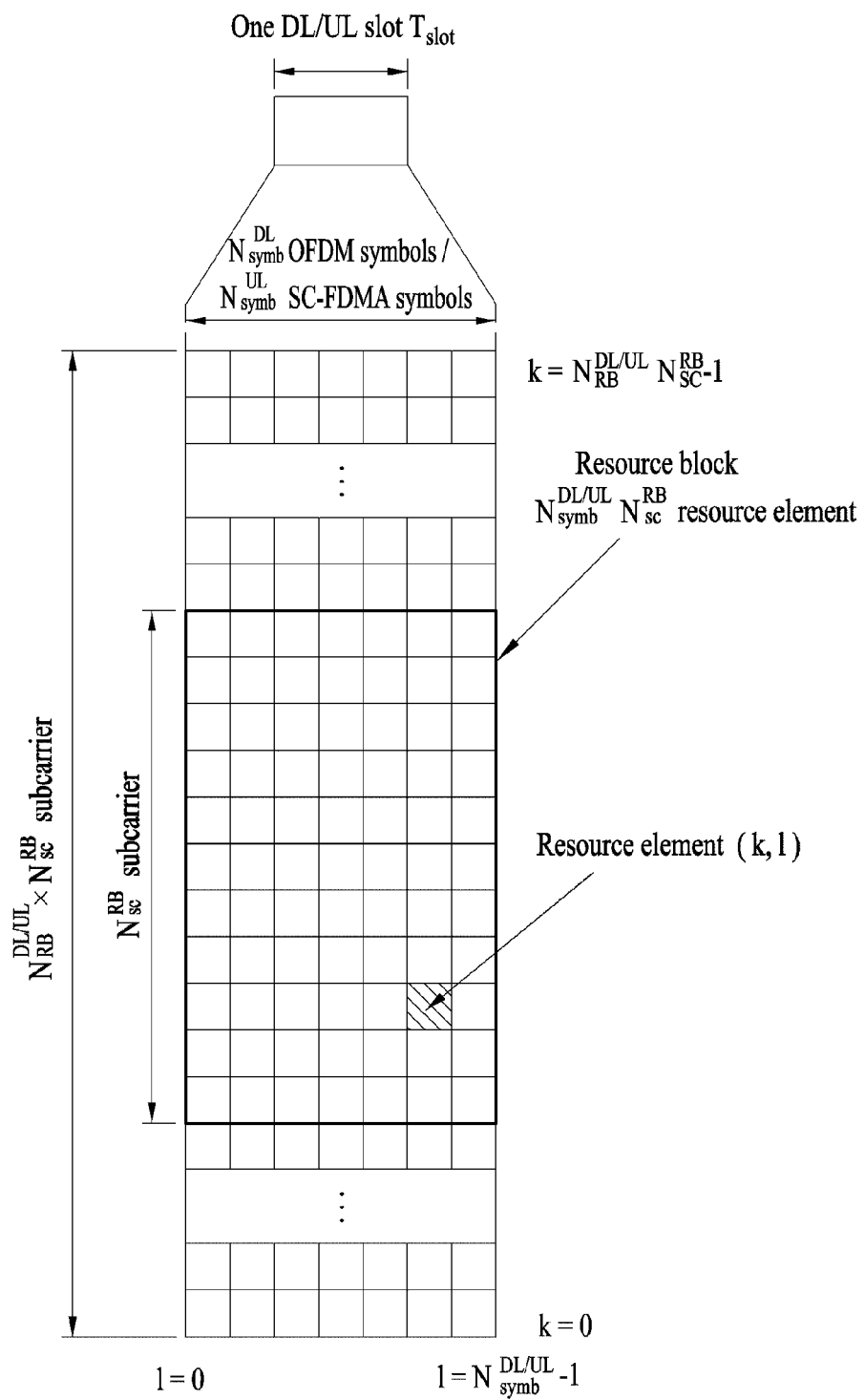
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
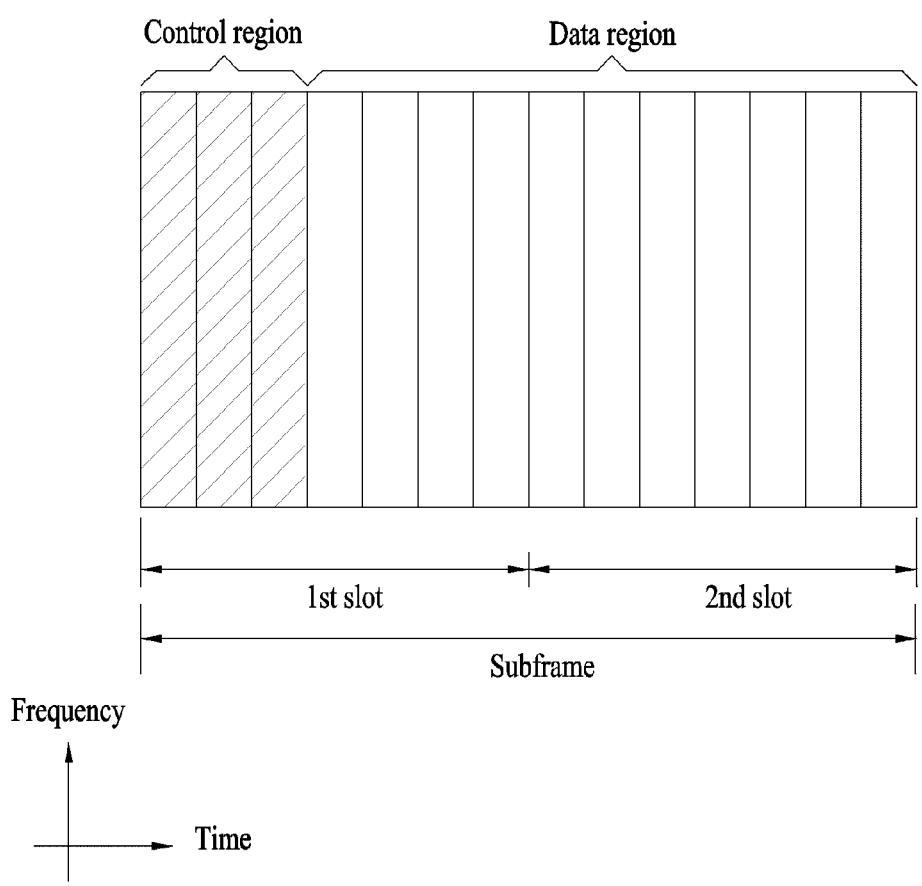
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
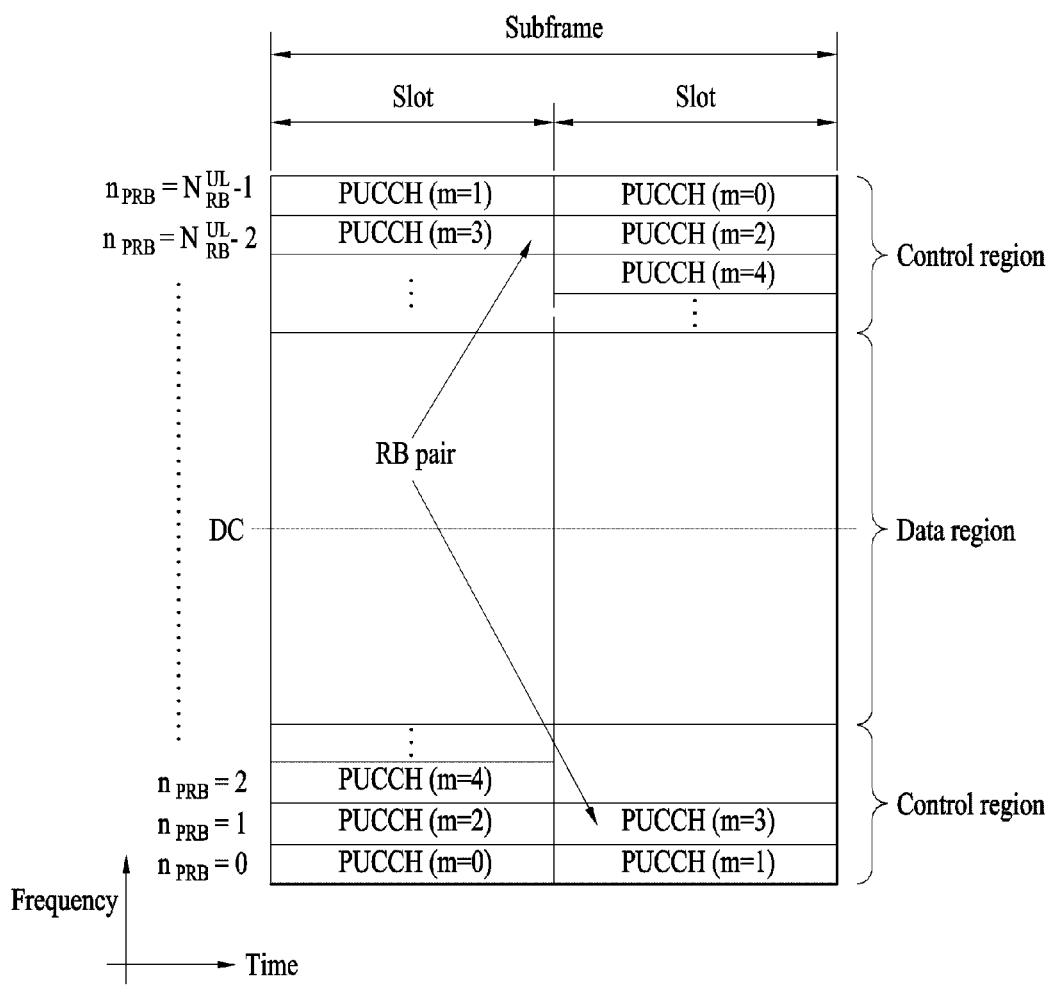
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Along with a rapid increase in data traffic attributed to the recent proliferation of smartphones, a future-generation wireless communication system such as 3GPP LTE-A seeks to efficiently utilize a limited frequency band. In this context, operating a cellular network such as an LTE system in an unlicensed band of 2.4 GHz or 5 GHz is under consideration.

Since it is basically assumed that wireless transmission and reception is performed in an unlicensed band through contention between communication nodes, each communication node is requested to make sure that another communication node is not transmitting a signal in the unlicensed band, by channel sensing before transmitting a signal. For the convenience of description, this operation is called listen before talk (LBT) and particularly, an operation for determining whether any other communication node is transmitting a signal is defined as carrier sensing (CS) or clear channel assessment (CCA). If it is determined as a result of CCA that there is no other communication node transmitting a signal, this state is defined as a channel unoccupied state. On the contrary, if there is any other communication node transmitting a signal, this state is defined as a channel occupied state. If an eNB or a UE is to transmit a signal in an unlicensed band in an LTE system, the eNB or the UE should perform LBT. While the eNB or the UE is transmitting a signal, nodes conforming to other communication standards such as Wi-Fi should not interfere with the eNB or the UE by performing LBT. For example, a Wi-Fi standard (e.g., 802.11ac) regulates that a CCA threshold is −62 dBm for a non-Wi-Fi signal and −82 dBm for a Wi-Fi signal. This means that upon receipt of a non-Wi-Fi signal with power (or energy) equal to or higher than −62 dBm, a station (STA) or an access point (AP) does not transmit a signal in order not to cause interference.

Figure 5:
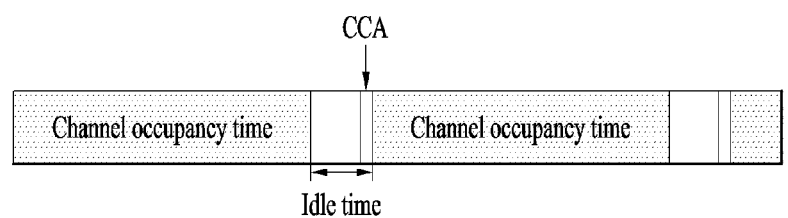
FIG. 5 exemplarily shows a LBT (listen before talk)-based channel access operation according to a FBE (frame based equipment).

For example, two LBT-based channel access mechanisms are defined in Europe, frame based equipment (FBE) and load based equipment (LBE). In FBE, one frame is comprised of a channel occupancy time (e.g., 1 to 10 ms) being a time period over which a communication node succeeding in channel access may continue transmission, and an idle time being at least 5% of the channel occupancy time, and CCA is defined as an operation for monitoring a channel during at least 20 μs at the last part of the idle time. A communication node periodically performs CCA on a frame basis. If the channel is unoccupied, the communication node transmits data during the channel occupancy time. On the other hand, if the channel is occupied, the communication node defers transmission and waits until a CCA slot of the next period. FIG. 5 illustrates an example of the FBE operation.

Figure 6:
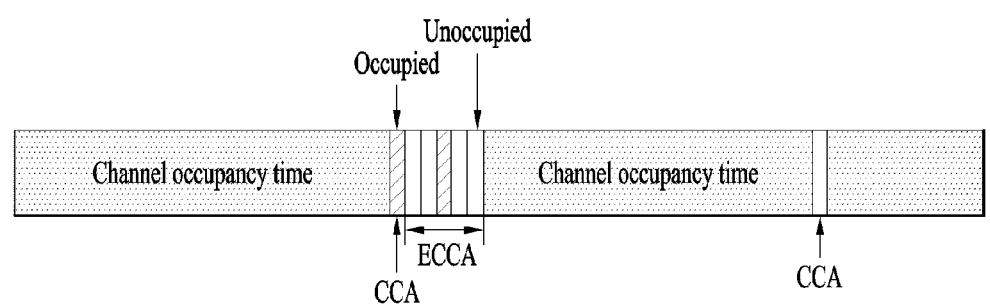
FIG. 6 exemplarily shows a LBT (listen before talk)-based channel access operation according to an LBE (load based equipment).

In LBE, the communication node first sets q (q∈{4, 5, . . . , 32}) and then performs CCA for one slot. If the channel is unoccupied in a first CCA slot, the communication node may transmit data by securing a channel occupancy time of (13/32)q ms. On the contrary, if the channel is occupied in the first CCA slot, the communication node selects N (N∈{1, 2, . . . , q}) arbitrarily (i.e., randomly) and stores the selected N value as an initial value for a counter. Then, the communication node senses a channel state on a CCA slot basis. Each time the channel is unoccupied in one specific CCA slot, the communication node decreases the value of the counter by 1. If the value of the counter is 0, the communication node (or UE) may transmit data during the channel occupancy time of (13/32)q ms. FIG. 6 illustrates an example of the LBE operation.

In the above examples, the channel occupied state or the channel unoccupied state may be determined by checking whether reception power exceeds a predetermined threshold in a CCA slot.

LTE system performs signal transmission in a unit of an SF including a TTI (transmission time interval) of 1 ms. Hence, when a TB for data is generated in LTE system, a TB size is determined according to the number of RBs (resource blocks) allocated in a frequency axis under an assumption that one SF is completely utilized. Yet, since timing of transmitting a signal transmitted by a transmission node follows an LBT operation, the timing may be arbitrary in the unlicensed band. Hence, if LTE system configures a fixed SF boundary, timing capable of transmitting a signal may not be matched with the SF boundary. Hence, it may be difficult to completely utilize a partial SF. If data transmission transmitted in an SF unit is maintained, as shown in FIG. 7, it is able to transmit a reservation signal for occupying a channel instead of transmitting data in case of initiating signal transmission according to an LBT operation at specific timing in an SF (rather than an SF boundary).

Meanwhile, discussion on a method of utilizing an unlicensed band is in progress in LTE system based on a CA (carrier aggregation) technique in a manner that a primary cell (P-cell) is configured in a licensed band and a secondary cell (S-cell) is configured in an unlicensed band. Hence, an SF boundary of the S-cell of the unlicensed band is restricted to follow an SF boundary defined in the P-cell. In particular, the fixed SF boundary shown in FIG. 7 may correspond to the SF boundary of the P-cell. In this case, when a specific signal follows a specific SF boundary, it may indicate that an SF in which the signal is transmitted and a resource allocation scheme in the SF are determined on the basis of the specific SF boundary.

Figure 7:
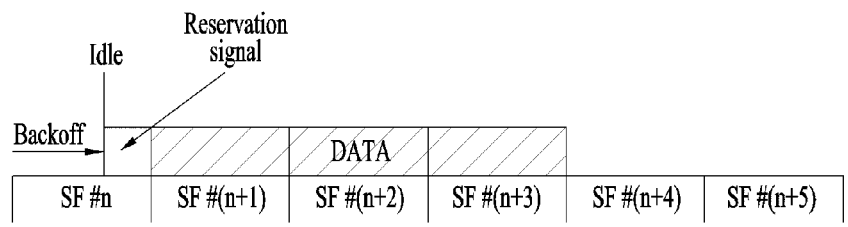
FIG. 7 shows data transmission in case of requiring transmission of a reservation signal for matching a subframe boundary.
Figure 8:
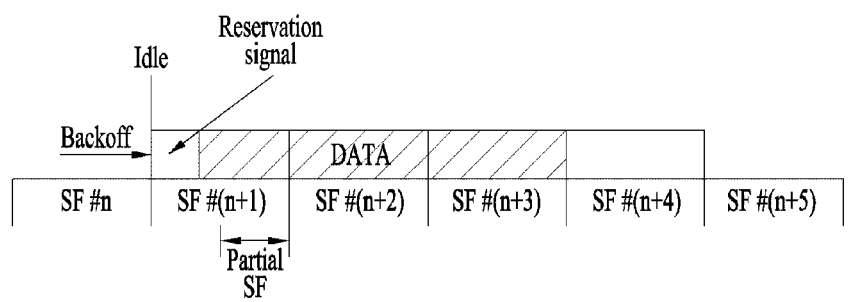
FIG. 8 shows a partial subframe structure for matching a subframe boundary.

As shown in FIG. 7, if a reservation signal is transmitted in an SF boundary only to permit the start of data transmission, it is unable to utilize a time resource for data transmission and the reservation signal may affect other transmission nodes as interference during a corresponding time window, thereby causing performance degradation. As a method for solving the aforementioned problem, it is able to permit data transmission to be initiated at a specific timing in an SF, generate a TB for a time window (hereinafter, a partial SF) from the specific timing to a next SF boundary, and transmit the generated TB. FIG. 8 exemplarily shows an operation of performing data transmission for the partial SF.

Figure 9:
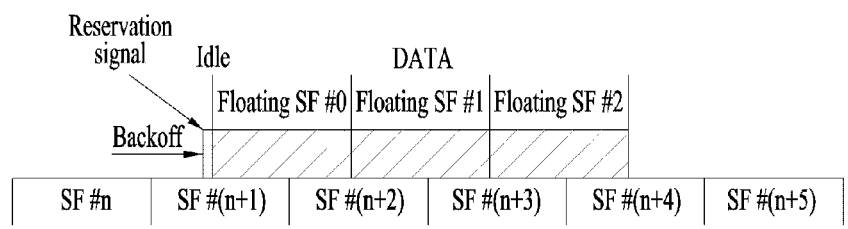
FIG. 9 shows a floating subframe structure.

Yet, since a length of the partial SF varies according to an LBT operation, it is necessary for a transmission node to prepare a plurality of TB sizes in advance, thereby increasing implementation complexity. In order to solve a problem of the implementation complexity of the transmission node due to the variability of the TB size, a method of transmitting signals capable of being commonly used by a plurality of reception nodes according to a fixed SF boundary and a method of configuring a timing capable of transmitting data for a specific reception node as an SF boundary according to an LBT operation (hereinafter, a floating SF) have been discussed. As an example, signals (e.g., PDCCH (physical downlink control channel), CRS (cell-specific reference signal), DM-RS (demodulation reference signal), etc.) except PDSCH (physical downlink shared channel) follow a fixed SF boundary (e.g., an SF boundary of a P-cell) and the PDSCH may follow a varying SF boundary according to an LBT operation. The varying SF boundary may be determined by a start timing of a very first OFDM symbol after timing capable of transmitting a signal according to an LBT operation. FIG. 9 exemplary shows an operation of transmitting data according to a floating SF.

Yet, since an SF boundary changes according to an LBT operation in the floating SF scheme, an OFDM resource allocation scheme for transmitting data (or a rate-matching scheme for data) may change. If control information follows a fixed SF boundary instead of being transmitted via a floating SF, there exists a problem in that a reception node should buffer signals as many as maximum 1 SF.

In order to overcome the problems of the partial SF and the floating SF, the present invention proposes a method of increasing a data transmission window within channel occupying time in a manner of reflecting a signal transmission initiation characteristic on random timing according to an LBT operation to data transmission while transformation of a TB generated in an SF unit is minimized. In the following, although operations of LTE system are explained as embodiments of the present invention, the method proposed by the present invention may be extensively applied to a random wireless communication system operating in an unlicensed band.

In the following, operations of a transmission node performing data transmission according to a fixed SF boundary are explained. And, when a TB is generated in response to specific OFDM symbols, it indicates that the transmission node generates the TB by assuming the specific OFDM symbols using an available time axis resource for data transmission.

[Method 1] A transmission node generates a TB (or a TB of a specific size) for the whole of OFDM symbols in an SF, configures a time window (flexible TX window) consisting of a plurality of OFDM symbols capable of initiating data transmission in an SF, performs rate-matching (or bit-level puncturing) under an assumption that data transmission is initiated in each of a plurality of the OFDM symbols in the time window, and generates a plurality of sets of coded bits. If it is able to transmit a signal according to a result of an LBT operation before a specific OFDM symbol, it is able to transmit coded bits corresponding to the specific OFDM symbol.

Figure 10:
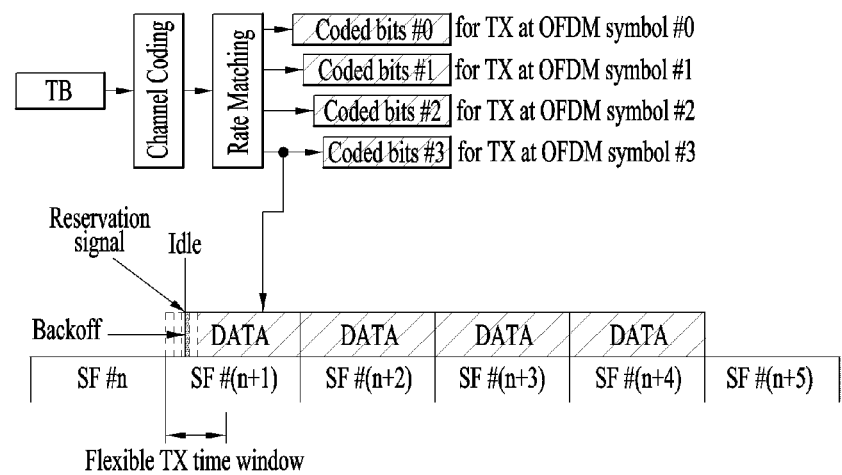
FIG. 10 shows a TB and coded bits for each symbol capable of starting to transmit data in a flexible TX time window according to one embodiment of the present invention.

If time taken for a transmission node to occupy a channel by performing an LBT operation has a length less than M number of OFDM symbols in an SF from a statistical standpoint, a method of making data transmission to be initiated within the M number of OFDM symbols without performing data transmission at an SF boundary may be efficient in that it is able to reduce waiting time of the transmission node from timing at which transmission of a signal is available according to an LBT operation to timing at which data is transmitted. As an example, when signal transmission is available according to an LBT operation within a time window consisting of the first M number of OFDM symbols in an SF, FIG. 10 shows an operation of permitting data transmission in a very first OFDM symbol after the M number of OFDM symbols. In the following, a time window including flexible data transmission initiation timing according to the LBT operation is referred to as "flexible TX time window".

In this case, an amount of resources available for transmitting data may vary according to a position of an OFDM symbol capable of initiating data transmission. Yet, since a TB size is determined by a MAC stage, it is difficult to adaptively increase or decrease a TB size within a short time in accordance with a variable data resource amount according to an LBT operation. Hence, when a TB is generated under an assumption that the TB uses all OFDM symbols in an SF, if it is able to transmit a signal according to a result of an LBT operation prior to a specific OFDM symbol after a plurality of sets of coded bits of which rate-matching (or bit-level puncturing) is applied to a plurality of OFDM symbol positions capable of initiating data transmission in the flexible TX time window are generated in a procedure of performing channel coding on the TB, the present invention proposes a method of transmitting coded bits corresponding to the specific OFDM symbol. In this case, it may be able to set a limit on a maximum size of the M number of OFDM symbols to minimize performance deterioration due to the rate-matching (or the bit-level puncturing). A transmission node may inform a reception node of the OFDM symbol at which the data transmission is initiated via specific control information or the reception node may detect the number of punctured data symbols in a manner that the transmission node transmits a reservation signal to the reception node immediately before the data transmission is performed. For example, if the transmission node corresponds to a base station, the base station may inform a UE of the OFDM symbol via DCI (dynamic control information) or the like. Meanwhile, if data transmission is not permitted by configuring a fixed time gap to an SF in which an LBT operation is resumed, the fixed time gap may be utilized as a time window for performing an LBT operation. Yet, a time window required for an actual LBT operation may vary. Hence, it may be efficient to minimize the time window according to a necessity in the aspect of increasing a data transmission window. In the aspect of increasing the data transmission window, the flexible TX time window may also be comprehended as a flexible time gap for performing an LBT operation. In particular, a part of OFDM symbols not used for transmitting data among the flexible TX time window may be comprehended as a time window required for performing an LBT operation in a current channel status.

Figure 11:
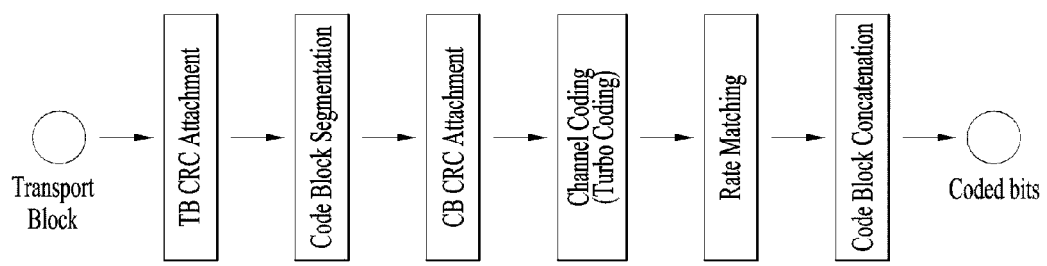
FIG. 11 shows a TB generating operation for data and a channel coding operation in 3GPP LTE/LTE-A system.

FIG. 11 shows a series of procedures for applying channel coding by generating a TB for data in LTE system according to embodiment of the present invention.

Figure 12:
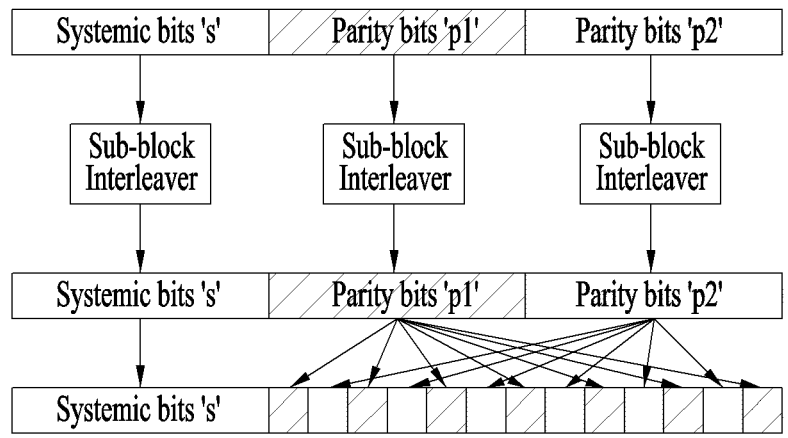
FIG. 12 shows a channel coding procedure in 3GPP LTE/LTE-A system.

In particular, a TB indicated as data in MAC layer is divided into a plurality of CBs in PHY layer and channel coding is applied to each of a plurality of the CBs. In LTE system, turbo coding, which is 1/3 of mother code rate, is applied as a channel coding scheme. As shown in FIG. 12, a coded CB consists of systemic bits and parity bits.

Figure 13:
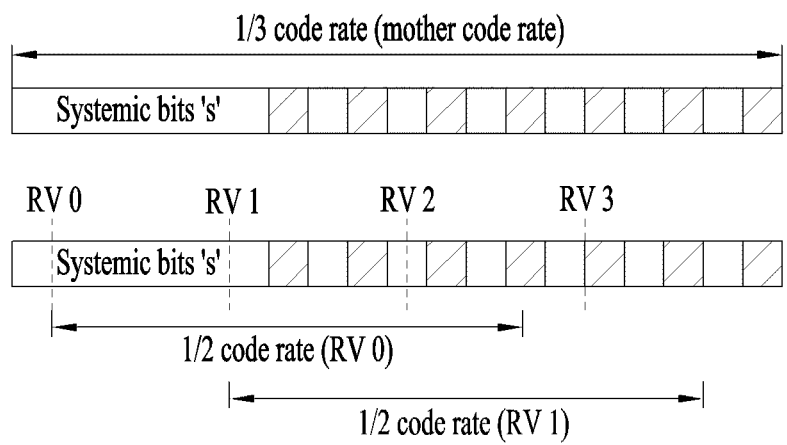
FIG. 13 shows a channel coding procedure in 3GPP LTE/LTE-A system.

Each of a plurality of the coded CB is stored in a circular buffer and a start point of a bit string, which follows a code rate configured for transmitting actual data in the coded CB, is determined according to a value named as an RV (redundancy version). A length of the bit string may be determined in the course of the rate-matching. FIG. 13 shows a procedure of storing a (coded) CB in a circular buffer and an operation of notifying a start point of a bit string to be transmitted with 1/2 code rate in the CB using an RV.

Figure 14:
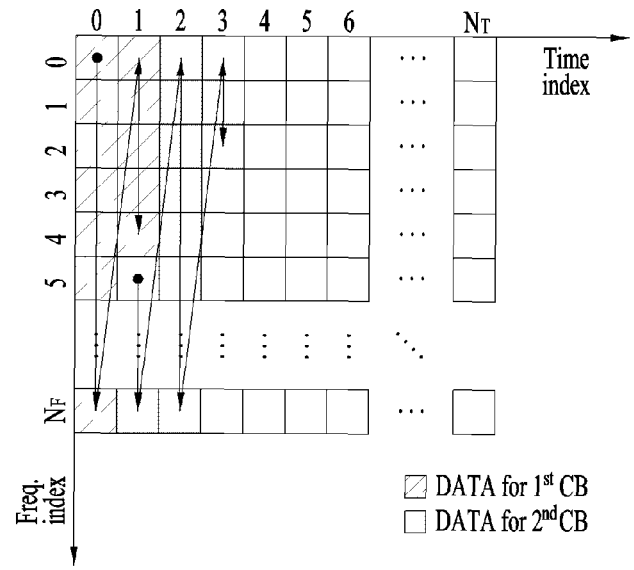
FIG. 14 shows RE mapping of a coded bit according to one embodiment of the present invention.

Subsequently, a bit string for each of a plurality of the CBs is combined with each other by a CB concatenation procedure. As shown in FIG. 14, the coded bits are allocated in a form of a data symbol to which modulation is applied according to each RE (resource element) using a frequency first mapping scheme.

The rate-matching (or the bit-level puncturing) on the time window (i.e., flexible TX time window) defined in the method 1 may be described as an operation of performing the rate-matching mentioned earlier in FIG. 13 several times by assuming a plurality of data start OFDM symbols. Or, when OFDM symbols smaller than a single SF are utilized for transmitting data after coded bits $C_0$ are generated by assuming a complete SF, it is able to generate new coded bits by performing bit-level puncturing on the coded bits $C_0$.

[Method 2] A transmission node configures a fixed time gap in which data is not transmitted and the time window (flexible TX time window) defined in the method 1 in an SF in which an LBT operation is resumed, generates a TB in response to OFDM symbols except the fixed time gap in the SF, and allocates data. If data transmission is performed in the SF according to the LBT operation, it is able to transmit coded bits to which rate-matching (or bit-level puncturing) is applied in response to an OFDM symbol at which data transmission is initiated in the flexible TX time window.

Figure 15:
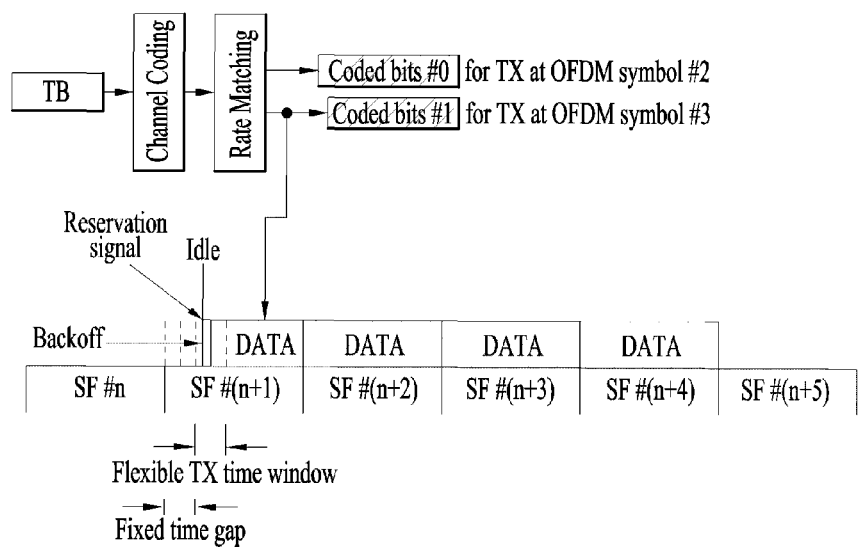
FIG. 15 shows a TB and coded bits for each symbol capable of starting to transmit data in a flexible TX time window according to one embodiment of the present invention.

If the transmission node applies the time window (flexible TX time window) defined in the method 1, data puncturing is performed on a part of coded bits according to a result of the LBT operation. Hence, a problem of deteriorating reception performance of data transmitted in a corresponding SF may occur. If there exists a minimum value of a time window required for performing the LBT operation, it is able to configure the minimum time window to be used for the SF in which the LBT operation is resumed only without transmitting data. In general, in order to perform the LBT operation, the transmission node sets a fixed time gap during which data transmission is not performed to the SF in which the LBT operation is resumed and minimizes a length of the flexible TX time window in consideration of the fixed time gap. By doing so, the data puncturing occurring in the flexible time window may be reduced. FIG. 15 exemplary shows an operation according to the method 2.

In the methods 1 and 2, the transmission node may inform the reception node of information on a rate-matching procedure (or a bit-level puncturing pattern) according to a data transmission start OFDM symbol in the flexible TX window. Or, the rate-matching procedure (or the bit-level puncturing pattern) of data according to the data transmission start point may be promised in advance between the transmission node and the reception node.

[Method 3] When a transmission node transmits data to which rate-matching (or bit-level puncturing) is applied according to the method 1 in response to an SF in which an LBT operation is resumed, the transmission node may increase transmit power in response to the number of OFDM symbols not used for transmitting data (or the number of OFDM symbols actually used for transmitting data).

When a TB is generated by assuming a complete SF according to the method 1 of the present invention, if data to which rate-matching (or bit-level puncturing) is applied is practically transmitted during a time window smaller than a single SF, since a coding rate becomes relatively higher as the number of coded bits is getting smaller, it may experience performance deterioration in terms of SNR (signal to noise power ratio). Hence, the present invention proposes a method of increasing transmit power in the SF in response to the number of OFDM symbols not used for transmitting data (or the number of OFDM symbols practically used for transmitting data) by the flexible TX window to compensate the SNR performance deterioration. For example, it may be able to increase transmit power in proportion to the number of OFDM symbols not used for transmitting data. The transmission node may inform a reception node of a corresponding relation between the number of OFDM symbols not used for transmitting data (or, the number of OFDM symbols used for practically transmitting data) and the transmit power via specific signaling. Or, the corresponding relation may be promised in advance between the transmission node and the reception node. For example, if the transmission node corresponds to a base station, the base station may directly inform a UE of a value of the transmit power via DCI or the like.

[Method 4] A transmission node configures a position of an additional OFDM symbol capable of performing separate data transmission irrespective of the flexible TX time window defined in the method 1 in response to an SF in which an LBT operation is resumed. If data transmission is initiated from the additional OFDM symbol, the transmission node generates a TB for available OFDM symbols in an SF in advance and transmits the generated TB.

Figure 16:
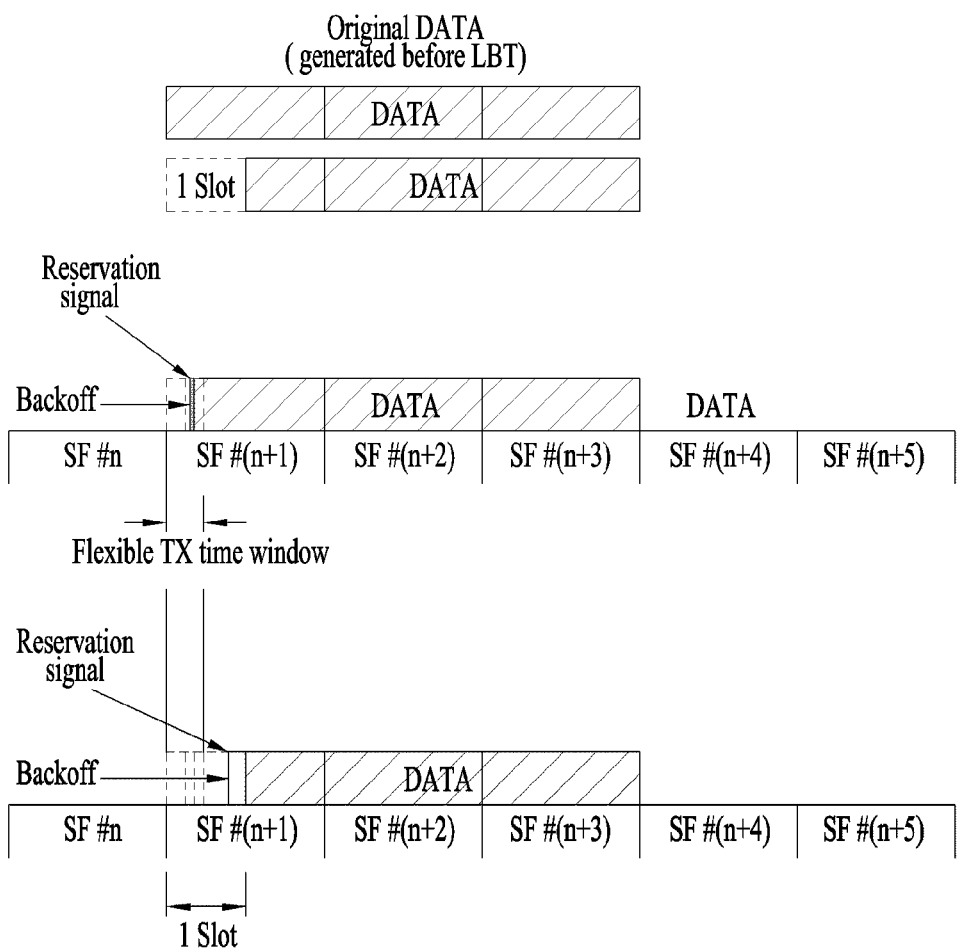
FIG. 16 shows a TB and coded bits for each symbol capable of starting to transmit data at an additional OFDM symbol position which is configured irrespective of a flexible TX time window according to one embodiment of the present invention.

When the time window (flexible TX time window) defined in the method 1 is applied to a specific SF, if data transmission according to an LBT operation is performed in the SF, rate-matching (or bit-level puncturing) is performed in consideration of OFDM symbols, which were unable to perform data transmission in the flexible TX time window. In the aforementioned procedure, a procedure of generating an available TB in advance according to the number of OFDM symbols available for transmitting data is not preferable in that implementation complexity of the transmission node increases. On the contrary, an operation of generating a TB in advance for a specific data transmission timing may be preferable in that it is able to mitigate data reception performance deterioration when rate-matching (or bit-level puncturing) performed on the data transmission timing excessively increases a code rate. Hence, the present invention proposes a method of configuring a position of an additional OFDM symbol capable of performing separate data transmission together with the flexible TX time window mentioned earlier in the method 1. In case of initiating data transmission in the additional OFDM symbol, the present invention proposes a method of generating a TB for available OFDM symbols in an SF in advance and transmitting the TB. FIG. 16 exemplary shows an operation of generating a TB in a slot unit at a slot boundary in addition to the flexible TX time window and an operation of configuring data transmission to be initiated using the TB.

[Method 5] A transmission node defines a specific SF boundary ($SFB_1$) and an SF boundary ($SFB_2$) of which the specific SF boundary is delayed as much as prescribed time (e.g., 1 slot) and independently configures ($FTW_1$, $FTW_2$) the time window (flexible TX time window) defined in the method 1 according to each SF boundary in response to an SF in which an LBT operation is resumed. If data transmission starts at the $FTW_1$, the transmission node may follow the $SFB_1$. If data transmission starts at the $FTW_2$, the transmission node may follow the $SFB_2$.

When the time window (flexible TX time window) defined in the method 1 is applied, there is a demerit in that a size of the flexible TX time window is restrictively configured in consideration of performance degradation due to data puncturing. Although the method 4 has a merit in that the demerit is supplemented by an additional data transmission start point, the method 4 still has a demerit in increasing implementation complexity of the transmission node in that it is necessary to generate a TB for the additional data transmission timing in advance.

Figure 17:
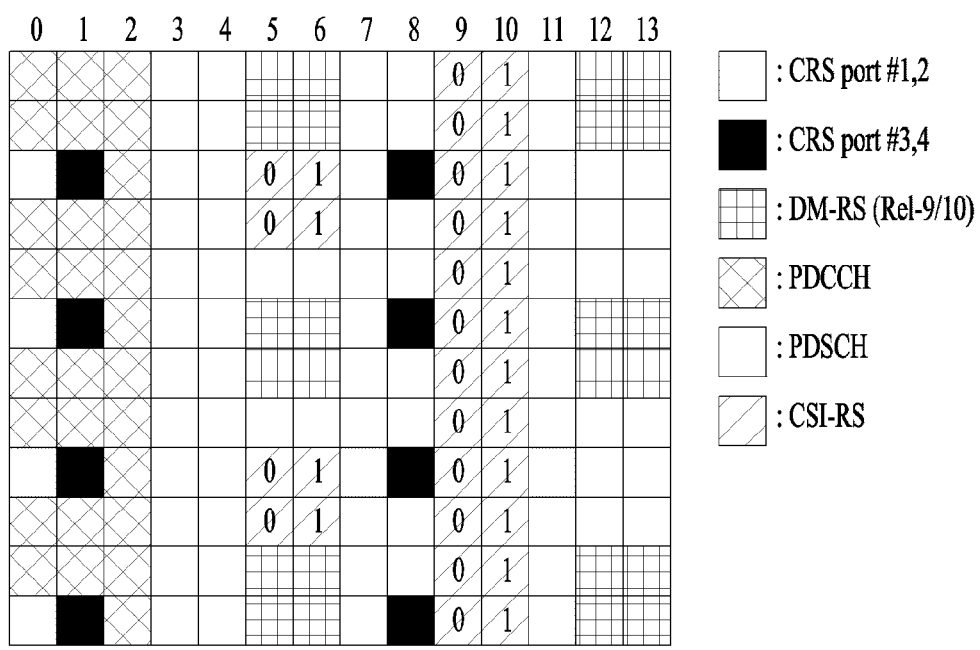
FIG. 17 shows RE (resource element) mapping of a downlink signal in 3GPP LTE/LTE-A system.

Meanwhile, in LTE system according to embodiments of the present invention, as shown in FIG. 1 or FIG. 17, data transmission is performed in a unit of a single SF consisting of two slots. As shown in FIG. 17, signals such as PDCCH, PDSCH, a DM-RS, a CRS, a CSI-RS (channel state information reference signal) and the like may exist in the SF. As shown in FIG. 17, it is able to see that most of the signals are assigned to the two slots in the SF using an identical resource allocation scheme. Hence, when a concept of the aforementioned floating SF is applied in a unit of a single slot, it may not be a big burden in the aspect of the transmission node.

Figure 18:
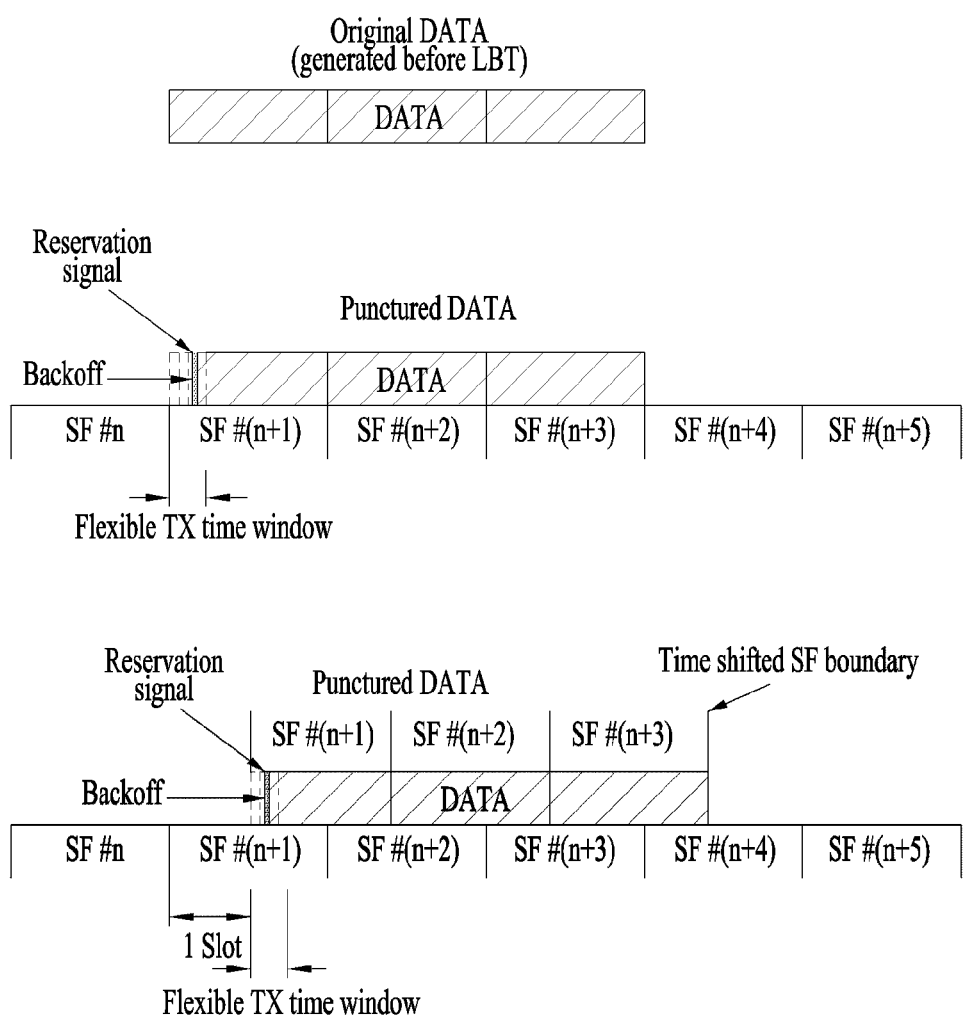
FIG. 18 shows an SF boundary shifted on a time axis, a flexible TX time window corresponding to the SF boundary, and data transmission according to one embodiment of the present invention.

Hence, when the time window (flexible TX time window) defined in the method 1 is applied, in order to solve a problem that a start point capable of transmitting data is restricted due to performance deterioration according to data puncturing, if it is able to define a plurality of SF boundaries (i.e., $SFB_1$, $SFB_2$, ..., $SFB_N$) at which a resource allocation scheme is maintained for most of signals, independently configure a flexible TX time window for each of a plurality of the SF boundaries (i.e., $FTW_1$, $FTW_2$, ..., $FTW_N$) and perform data transmission at a specific flexible TX time window (i.e., $FTW_i$, where $i \in \{1, 2, ..., N\}$) by performing an LBT operation, the present invention proposes an operation of transmitting data according to an SF boundary (i.e., $SFB_i$) corresponding to the flexible TX time window. When an independent flexible TX time window is configured in response to a fixed SF boundary and an SF boundary delayed as much as 1 slot from the fixed SF boundary and data transmission is initiated at a specific flexible TX time window, FIG. 18 shows a method of performing data transmission according to an SF boundary corresponding to the flexible TX time window.

Figure 19:
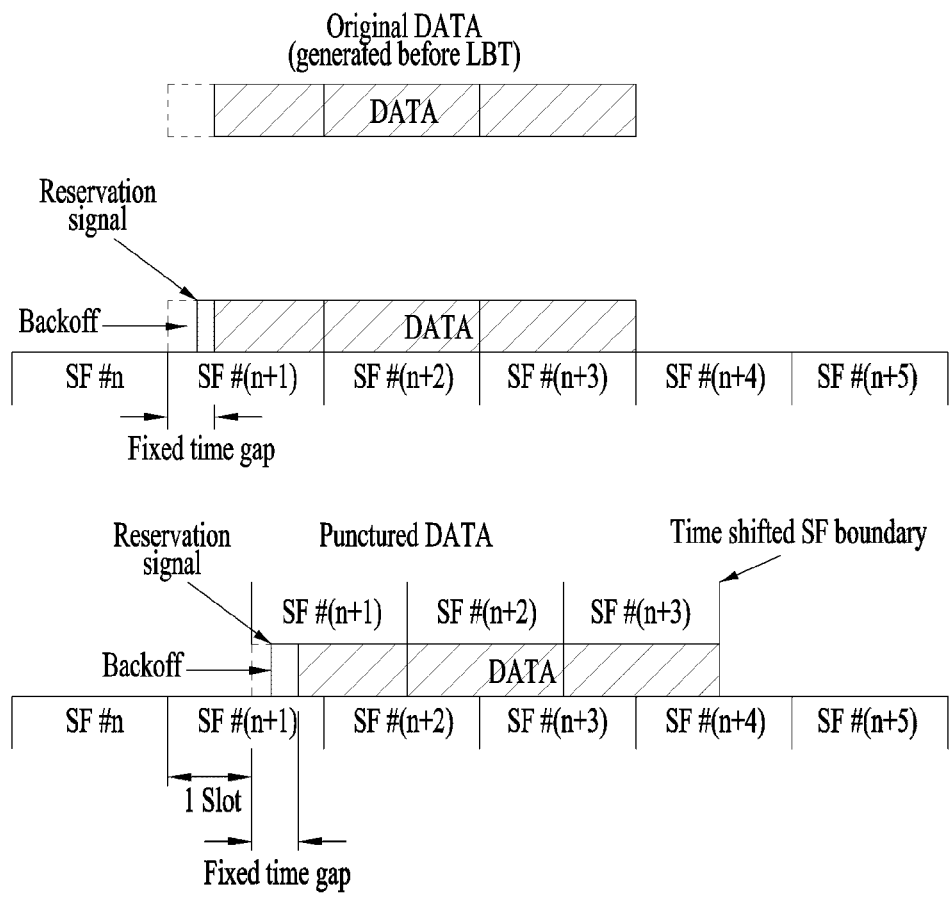
FIG. 19 shows an SF boundary shifted on a time axis, a fixed time gap corresponding to the SF boundary, and data transmission according to one embodiment of the present invention.

As a further different operation of the present invention, as shown in FIG. 19, if it is able to define a plurality of SF boundaries (i.e., $SFB_1$, $SFB_2$, ..., $SFB_N$), independently configure a fixed time gap according to each of a plurality of the SF boundaries (i.e., $FTG_1$, $FTG_2$, ..., $FTG_N$), and perform transmission of a signal (e.g., a reservation signal) in a specific fixed time gap (i.e., $FTG_i$ where $I \in \{1, 2, ..., N\}$) by performing an LBT operation, the method 5 may be transformed into an operation of transmitting data according to an SF boundary (i.e., $SFB_i$) corresponding to the specific fixed time gap.

In the present invention, when a channel is in an unoccupied state, a series of signals capable of being continuously transmitted by a base station according to a result of an LBT operation are defined as TX burst.

[Method 6] A transmission node generates a TB for the whole of OFDM symbols in an SF (or a TB of a specific size), configures a time window (flexible END time window) consisting of a plurality of OFDM symbols capable of ending data transmission in response to the last SF of TX burst, calculates time necessary for an LBT operation for transmitting additional TX burst after the TX burst, selects an OFDM symbol for ending data transmission in the time window, performs rate-matching (or bit-level puncturing), and transmits coded bits corresponding to the OFDM symbol for ending the data transmission.

According to the method 1, a flexible time gap for an LBT operation is configured at a fore part of an SF. In this case, there is a demerit in that it is necessary for a UE to perform BD (blind detection) on a data transmission start point such as PDSCH and the like. In this case, as a variation of the method 1, it may consider a method of configuring the flexible time gap for the LBT operation at a latter part of an SF. For example, when a channel is in an unoccupied state, if a series of signals capable of being continuously transmitted by a base station according to a result of an LBT operation are defined as TX burst, a back-off window necessary for an LBT operation to be performed after the TX burst may be calculated in advance and a window as much as the back-off window may be configured in a form of a flexible time gap in the rear of the last SF of the TX burst.

Figure 20:
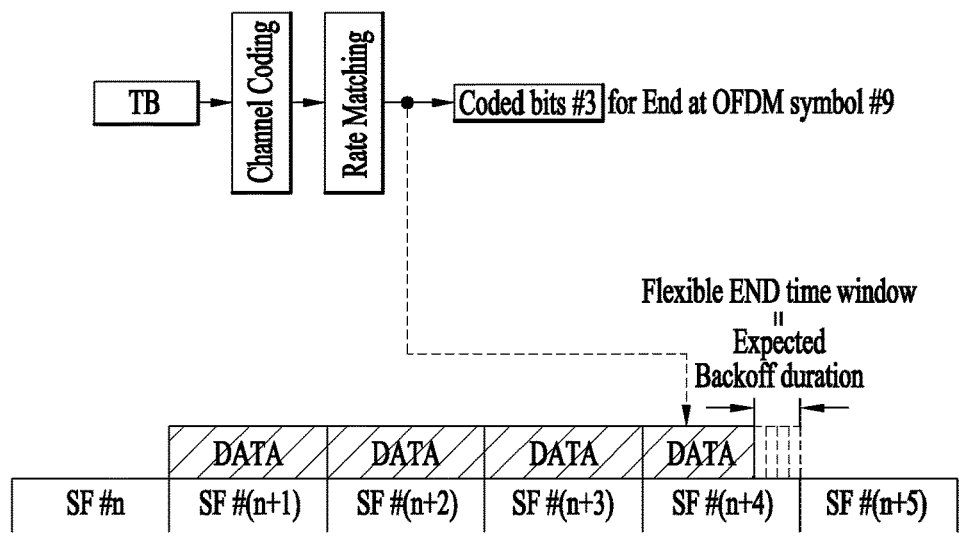
FIG. 20 shows a flexible END time window, TB generation according to the flexible END time window, and coded bits according to one embodiment of the present invention.

More specifically, a length of the back-off window may be calculated as "value of back-off counter*time length of CCA slot+deferred time+time margin". And, when TX burst 1 and TX burst 2 are transmitted in succession, the flexible END time window, which is configured at the last SF of the TX burst 1 to transmit the TX burst 2, may be calculated in advance before the last SF of the TX burst 1. In this case, it may be able to make a TB size to be smaller in advance at the last SF of the TX burst 1 according to the number of OFDM symbols reduced by the use of the flexible END time window. FIG. 20 shows an operation according to the method 6.

[Method 7] A transmission node configures a time window (fixed time gap) not transmitting data in an SF and the time window (flexible END time window) defined in the method 6 in response to the last SF of the TX burst, allocates data by generating a TB for OFDM symbols except the fixed time gap in the SF, calculates time necessary for an LBT operation for transmitting additional TX burst after the TX burst, selects an OFDM symbol for ending data transmission in the flexible END time window, performs rate-matching (or bit-level puncturing), and transmits coded bits corresponding to the OFDM symbol for ending the data transmission.

Figure 21:
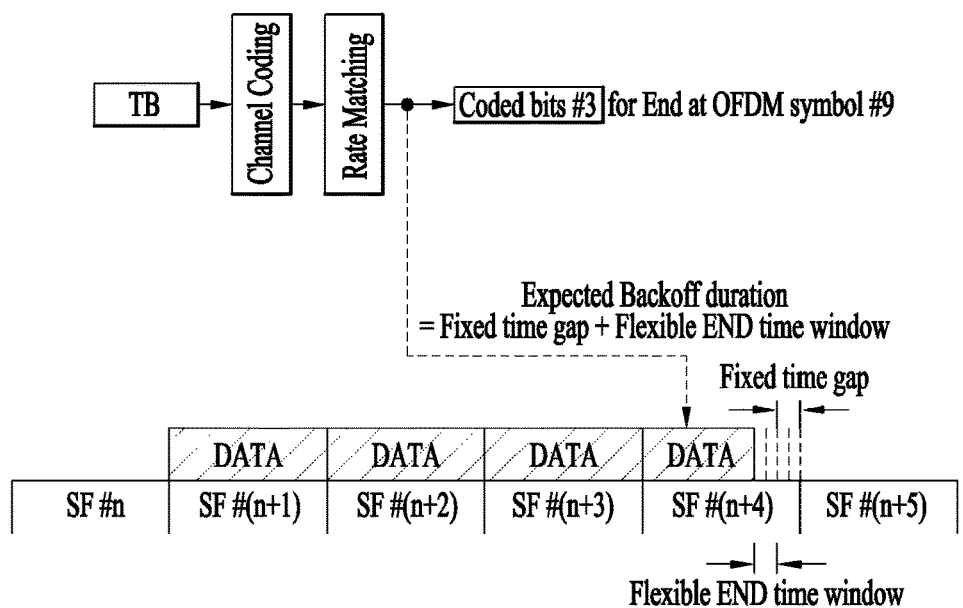
FIG. 21 shows a flexible time gap, a flexible END time window, TB generation according to the flexible time gap and the flexible END time window, and coded bits according to one embodiment of the present invention.

Similar to the method 2 of the present invention, the time window (flexible END time window) defined in the method 6 may be utilized together with a fixed time gap. In particular, a TB size for the last SF of the TX burst is calculated by assuming the remaining OFDM symbols except a fixed time gap in a corresponding SF, an OFDM symbol for ending data transmission in the flexible END time window is selected by anticipating a following LBT operation and rate-matching corresponding to the selected OFDM symbol may be performed. FIG. 21 shows an operation according to the method 7.

[Method 8] When data to which rate-matching (or bit-level puncturing) is applied according to the method 6 is transmitted to the last SF of the TX burst, a transmission node may increase transmit power in response to the number of OFDM symbols not used for transmitting data (or the number of OFDM symbols used for transmitting actual data).

Similar to the method 3 of the present invention, if rate-matching (or bit-level puncturing) is applied to the last SF of the TX burst, it may consider an operation of increasing transmit power in a corresponding SF in consideration of the number of OFDM symbols not used for transmitting data.

And, the flexible END time window mentioned earlier in the methods 6, 7 and 8 may be applied together with a floating SF scheme.

[Method 9] A transmission node configures a TB of a specific size smaller than a size of a TB in a complete SF using a semi-static scheme in response to an SF in which an LBT operation is resumed (or a lastly transmitted SF among a series SFs).

It is able to configure a TB smaller than a TB of a complete SF by assuming a minimally necessary back-off window in response to an SF in which the LBT operation is resumed. As an example, a base station excludes an OFDM symbol corresponding to a minimum CW (contention window) for an LBT operation from the whole of SFs and may be able to determine a TB size on the basis of the remaining OFDM symbols. Specifically, scaling may be performed on the number (i.e., $N_{RB}$) of RBs (resource blocks), which is utilized as an input value when a TB size is calculated, by configuring a scaling factor $\alpha$ (i.e., $0<\alpha \leq 1$) as $N_{RB, NEW}$=floor ($\alpha*N_{RB}$). In this case, floor (.) indicates a FLOOR function. A base station may inform a UE of the scaling factor via a higher layer signal.

Figure 22:
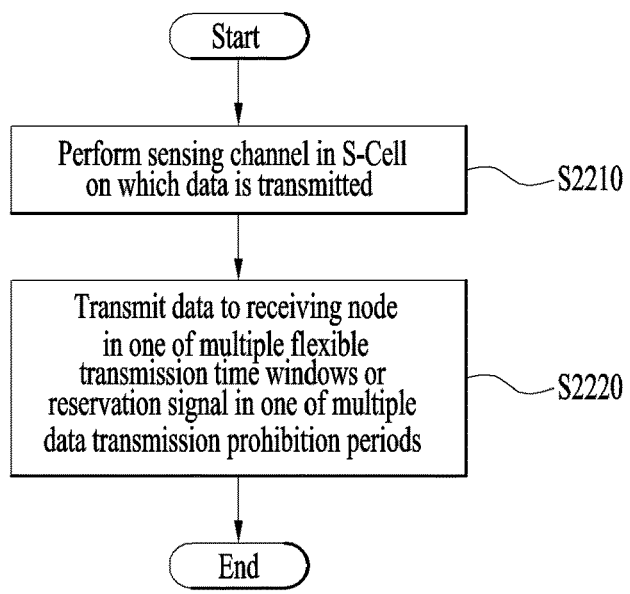
FIG. 22 is a flowchart for operations according to embodiments of the present invention.

FIG. 22 is a flowchart for operations according to embodiments of the present invention. FIG. 22 shows a method of sensing a channel in an unlicensed band in a wireless communication system and a method of transmitting data according to the channel. The method may be performed by a transmission node performing the channel sensing and the data transmission.

The transmission node may sense a channel in a secondary cell (S-cell) on which data of is to be transmitted in the unlicensed band [S2210]. After the channel is sensed, if it is determined as the channel is in an unoccupied state, the transmission node may transmit the data to a reception node in one time window among a plurality of predetermined flexible TX time windows or may transmit a reservation signal to the reception node in one window among a plurality of data transmission END windows configured for the data transmission in advance [S2220]. The specific time may correspond to time corresponding to one slot.

A plurality of the flexible TX time windows and a plurality of the data transmission END windows may be configured to respectively have a boundary of a transmission unit shifted from a boundary of a transmission unit of a primary cell (p-cell) transmission structure as much as specific time. And, the data may be transmitted according to the boundary of the transmission unit of the flexible TX time window or the boundary of the transmission unit of the data transmission END window.

In case of performing the data transmission, the transmission node generates a TB (transport block) corresponding to the data to be transmitted, generates maydidates coded bits by applying rate-matching or bit-level puncturing, which is performed for each of data transmission start maydidate timings in a plurality of the flexible TX time windows, to the TB, and transmits the generated coded bits corresponding to a data transmission start timing according to a result of the channel sensing. In this case, the data transmission start timing may be transmitted to the reception node via control information or may be informed to the reception node by detecting the reservation signal.

And, it may not generate candidate coded bits for data transmission start candidate timings corresponding to a plurality of the data transmission END window among a plurality of the flexible TX time windows.

And, a length of a plurality of the flexible TX time windows may be configured to be minimized.

And, transmit power of the data transmission may be increased in proportion to a length of a window not used for transmitting data among a plurality of the flexible TX time windows.

The transmission node may transmit information on the transmit power of the data transmission to the reception node via specific signaling.

In the foregoing description, embodiments according to the present invention are briefly explained with reference to FIG. 22. Yet, an embodiment related to FIG. 22 may alternately or additionally include at least a part of the aforementioned embodiment(s).

Figure 23:
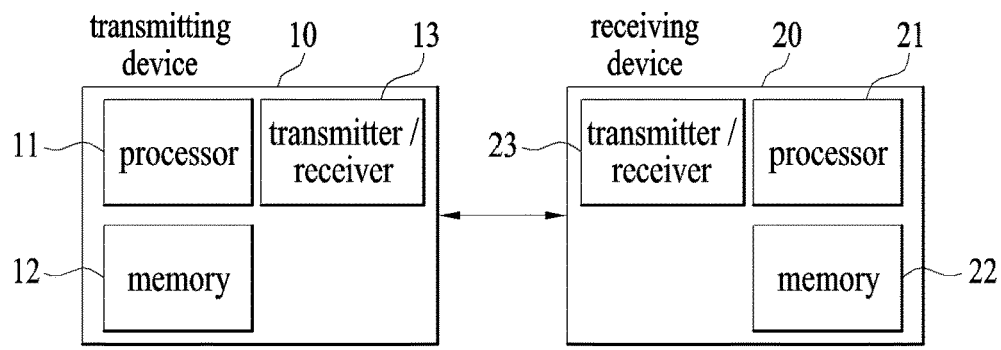
FIG. 23 is a block diagram of a device for implementing embodiment(s) of the present invention.

FIG. 23 is a block diagram of a transmitting device 10 and a receiving device 20 configured to implement exemplary embodiments of the present invention. Referring to FIG. 23, the transmitting device 10 and the receiving device 20 respectively include transmitter/receivers 13 and 23 for transmitting and receiving radio signals carrying information, data, signals, and/or messages, memories 12 and 22 for storing information related to communication in a wireless communication system, and processors 11 and 21 connected operationally to the transmitter/receivers 13 and 23 and the memories 12 and 22 and configured to control the memories 12 and 22 and/or the transmitter/receivers 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receivers 13 and 23 include one or more antennas. An antenna performs a function of transmitting signals processed by the transmitter/receivers 13 and 23 to the exterior or receiving radio signals from the exterior to transfer the radio signals to the transmitter/receivers 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

As is apparent from the above description, the method and apparatus for transmitting or receiving a downlink signal within an unlicensed band of a wireless communication system according to the embodiments may efficiently transmit or receive the downlink signal within an unlicensed band, such that resource use efficiency in the unlicensed band may be increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting data by sensing a channel in an unlicensed band, which is performed by a transmission node in a wireless communication system, comprising:
   sensing a channel on a secondary cell (S-cell) on which data is to be transmitted in the unlicensed band; and
   if it is determined that the channel on the S-cell is in an unoccupied state as a result of the channel sensing, transmitting data to a reception node in one of a plurality of flexible transmission (TX) time windows configured in advance or transmitting a reservation signal to the reception node in one of a plurality of data transmission prohibit windows configured in advance for the data transmission,
   wherein the plurality of the flexible TX time windows and the plurality of the data transmission prohibit windows are configured to respectively have a boundary of a transmission unit shifted from a boundary of a transmission unit of a primary cell (P-cell) transmission structure by a specific time, and
   wherein the data transmission is performed according to a boundary of a transmission unit of a corresponding flexible TX time window or a boundary of a transmission unit of a corresponding data transmission prohibit window.

2. The method of claim 1, wherein the specific time has a duration corresponding to one slot.

3. The method of claim 1, wherein the transmitting further comprises:
   generating a TB (transport block) corresponding to the data to be transmitted;
   generating candidate coded bits by applying rate-matching or bit-level puncturing, for each of data transmission start candidate timings in the plurality of the flexible TX time windows, to the TB; and
   transmitting the generated coded bits corresponding to a data transmission start timing determined according to the result of the channel sensing.

4. The method of claim 3, wherein the data transmission start timing is transmitted to the reception node in advance via control information or is informed to the reception node by detecting the reservation signal.

5. The method of claim 3, wherein candidate coded bits for data transmission start candidate timings corresponding to the plurality of the data transmission prohibit windows are not generated among the plurality of the flexible TX time windows.

6. The method of claim 1, wherein a length of the plurality of the flexible TX time windows is configured to be minimized.

7. The method of claim 1, wherein transmission power of the data transmission is increased in proportion to a length of a duration in which is not used for transmitting data in the plurality of the flexible TX time windows.

8. The method of claim 7, further comprising transmitting information on the transmission power of the data transmission to the reception node via specific signaling.

9. A transmission node configured to perform channel sensing and data transmission according to the sensed channel in an unlicensed band in a wireless communication system, comprising:
   a transmitter;
   a receiver; and
   a processor configured to control the transmitter and the receiver, the processor configured to sense a channel on a secondary cell (S-cell) on which data is to be transmitted in the unlicensed band, the processor, if it is determined that the channel on the S-cell is in an unoccupied state as a result of the channel sensing, transmit data to a reception node in one of a plurality of flexible transmission (TX) time windows configured in advance or transmit a reservation signal to the reception node in one of a plurality of data transmission prohibit windows configured in advance for the data transmission,
   wherein the plurality of the flexible TX time windows and the plurality of the data transmission prohibit windows are configured to respectively have a boundary of a transmission unit shifted from a boundary of a transmission unit of a primary cell (P-cell) transmission structure by a specific time, and wherein the data transmission is performed according to a boundary of a transmission unit of a corresponding flexible TX time window or a boundary of a transmission unit of a corresponding data transmission prohibit window.

10. The transmission node of claim 9, wherein the specific time has a duration corresponding to one slot.

11. The transmission node of claim 9, wherein the processor is configured to generate a TB (transport block) corresponding to the data to be transmitted, generate candidate coded bits by applying rate-matching or bit-level puncturing, for each of data transmission start candidate timings in the plurality of the flexible TX time windows, to the TB and transmit the generated coded bits corresponding to a data transmission start timing determined according to the result of the channel sensing.

12. The transmission node of claim 11, wherein the data transmission start timing is transmitted to the reception node in advance via control information or is informed to the reception node by detecting the reservation signal.

13. The transmission node of claim 11, wherein candidate coded bits for data transmission start candidate timings corresponding to the plurality of the data transmission prohibit windows are not generated among the plurality of the flexible TX time windows.

14. The transmission node of claim 9, wherein a length of the plurality of the flexible TX time windows is configured to minimized.

15. The transmission node of claim 9, wherein transmission power of the data transmission is increased in proportion to a length of a duration in which is not used for transmitting data in the plurality of the flexible TX time windows.

16. The transmission node of claim 15, wherein the processor is configured to transmit information on the transmission power of the data transmission to the reception node via specific signaling.

* * * * *